(12) United States Patent
Morimoto

(10) Patent No.: US 7,944,789 B2
(45) Date of Patent: May 17, 2011

(54) RECORDING MEDIUM PLAYBACK DEVICE AND METHOD THEREOF

(75) Inventor: Mitsutoshi Morimoto, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 303 days.

(21) Appl. No.: 12/160,268

(22) PCT Filed: Jan. 23, 2007

(86) PCT No.: PCT/JP2007/050944
§ 371 (c)(1),
(2), (4) Date: Jul. 8, 2008

(87) PCT Pub. No.: WO2007/097148
PCT Pub. Date: Aug. 30, 2007

(65) Prior Publication Data
US 2009/0073828 A1  Mar. 19, 2009

(30) Foreign Application Priority Data
Feb. 24, 2006  (JP) ................................ 2006-048138

(51) Int. Cl.
*G11B 27/36* (2006.01)
(52) U.S. Cl. .................. 369/53.15; 369/53.17; 369/30.1
(58) Field of Classification Search ............... 369/47.15, 369/53.21, 53.12, 53.13, 53.15, 53.17, 53.31, 369/30.1, 53.18; 705/51, 52; 726/31
See application file for complete search history.

(56) References Cited

U.S. PATENT DOCUMENTS

| | | | |
|---|---|---|---|
| 6,169,710 B1* | 1/2001 | Arai | 369/30.11 |
| 6,625,096 B1* | 9/2003 | Arai | 369/47.34 |
| 6,674,698 B2* | 1/2004 | Ozaki | 369/47.14 |
| 6,914,863 B2* | 7/2005 | Ono | 369/53.12 |
| 7,149,160 B2* | 12/2006 | Kibashi et al. | 369/47.14 |
| 2003/0179886 A1* | 9/2003 | Yamada | 380/277 |
| 2005/0174914 A1* | 8/2005 | Sugimura et al. | 369/59.23 |

FOREIGN PATENT DOCUMENTS

| | | |
|---|---|---|
| JP | 07-098871 A | 4/1995 |
| JP | 11-328686 A | 11/1999 |
| JP | 2003-272289 A | 9/2003 |
| JP | 2004-110309 A | 4/2004 |
| JP | 2005-222626 A | 8/2005 |
| JP | 2006-119755 A | 5/2006 |

\* cited by examiner

*Primary Examiner* — Thang V Tran
*Assistant Examiner* — Thomas D Alunkal
(74) *Attorney, Agent, or Firm* — Sughrue Mion, PLLC

(57) ABSTRACT

When playback of a recording medium, which stores content data that is only allowed to be played back for a limited number of times, is forcibly terminated due to a scratch on the recording medium, the playback of the content data residing at a subsequent location that follows a location having the scratch is performed without the number of playbacks being counted, and without a particular operation such as skip. Upon the playback after the forced termination, an address of an optical disk at which the playback was performed at the time of the forced termination is stored in a RAM unit. The address stored in the RAM unit is read out, and the content data residing at a subsequent address that follows the read address in terms of a predetermined number of addresses is played back. When data residing at the subsequent address that follows the read address cannot be read, the playback is repeated for a predetermined number of times for other addresses that follow the previous address at intervals in terms of the predetermined number of the addresses.

3 Claims, 2 Drawing Sheets

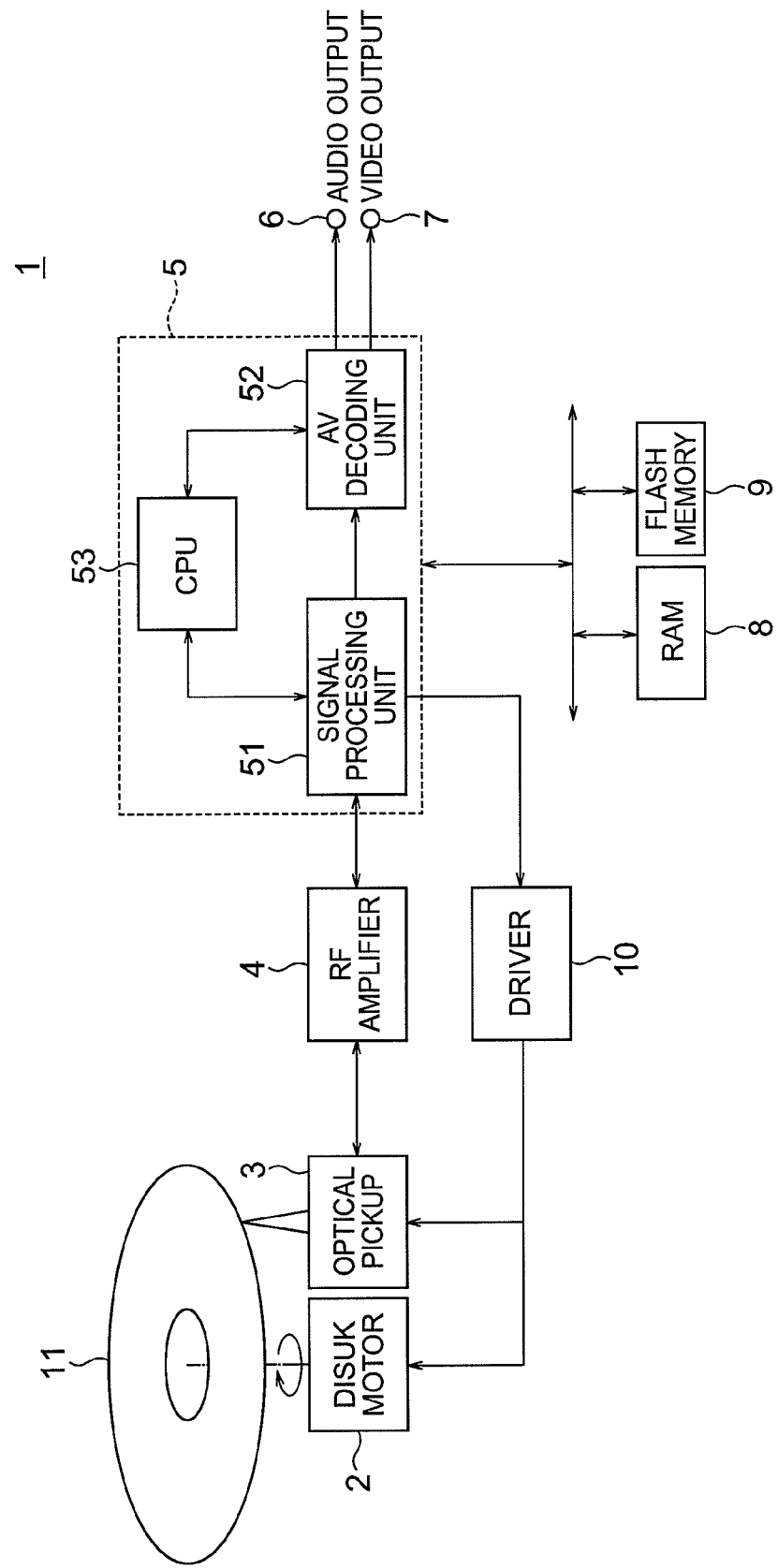

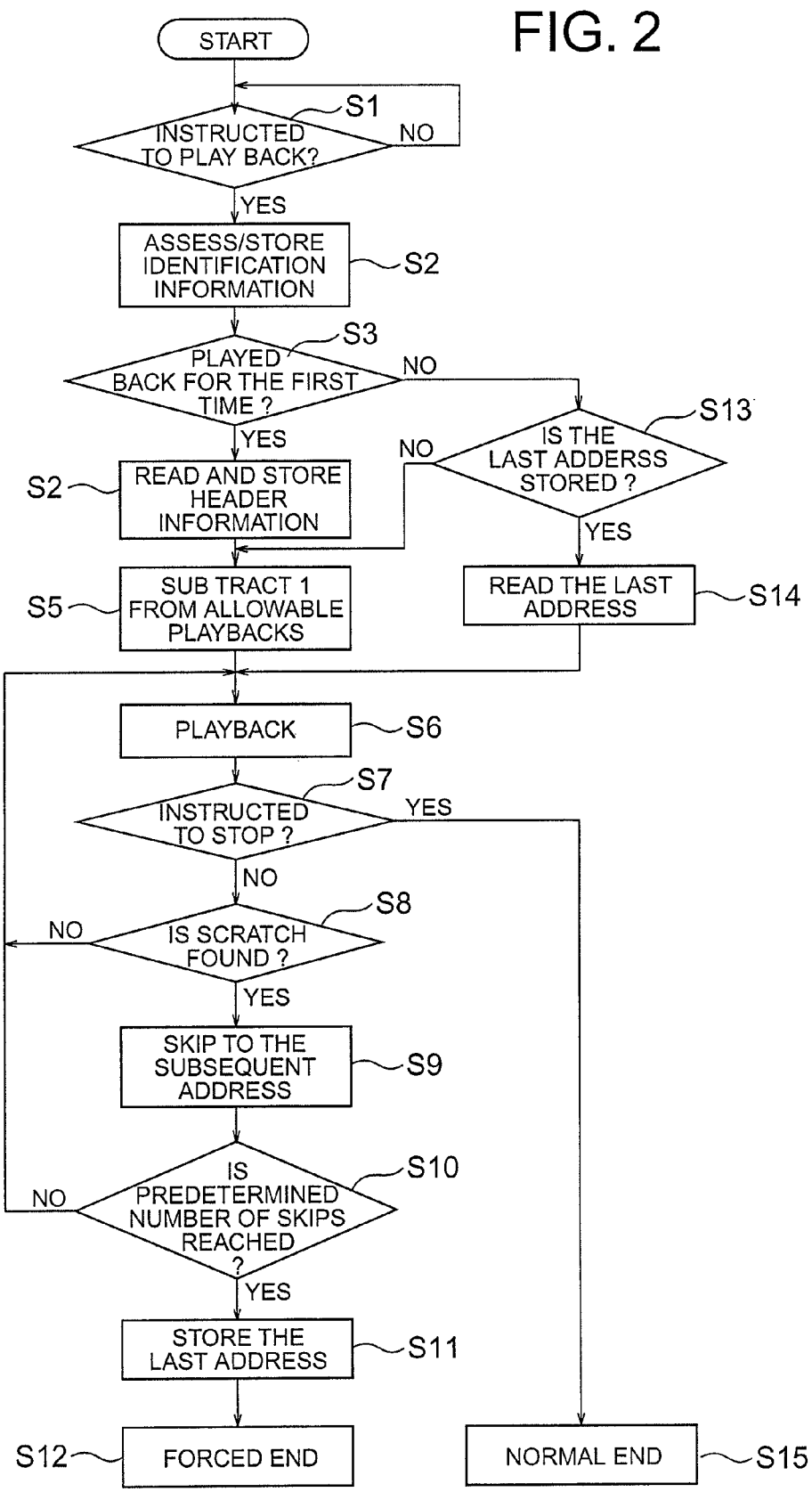

RECORDING MEDIUM PLAYBACK DEVICE AND METHOD THEREOF

CROSS REFERENCE TO RELATED APPLICATION

This application is a National Stage of International Application No. PCT/JP2007/050944 filed on Jan. 23, 2007, claiming priority based on Japanese Patent Application No. 2006-048138, filed Feb. 24, 2006, the contents of all of which are incorporated herein by reference in their entirety.

TECHNICAL FIELD

The present invention relates to a recording medium playback device for playing back a recording medium such as an optical disk and the method thereof.

RELATED ART

Reading of information such as audio and video data from a recording medium such as an optical disk may fail due to a scratch on a surface of the optical disk. In such a case, the reading of the information has to be started again from a location which at a predetermined interval follows the location at which the reading has failed. Also, several retries will be attempted to read the information from the optical disk. For details, refer to Patent Document 1 (Japanese Patent Application Laid-Open Publication No. H07-98871).

When the scratch on the optical disk is so large that it cannot be skipped with one single skip, a playback device disclosed in Patent Document 1 tries to get out of the large scratch by performing multiple skips. Since the information such as the audio and video data cannot be played back during operation of the skips, an upper limit must be applied to the allowable number of skips. Also, if a location damaged by the scratch cannot be skipped even when the upper limit has been reached, the optical disk is then regarded as being unable to be read and the reading of the optical disk will be forcibly terminated. After that, the playback of the information in the optical disk has to be started again all the way from the beginning.

Furthermore, when the information stored in the recording medium is only allowed to be played back for a limited number of playbacks, as explained above, the playback is attempted all the way from the beginning after the forced termination caused by the scratch. Understandably, the playback at this time is counted as another round of the playback, and therefore, to a user's inconvenience, the number of playbacks is further counted down.

DISCLOSURE OF THE INVENTION

Problem to be Solved by the Invention

It is an object of the present invention to provide a playback device and method that allow reading of information stored in a recording medium to be performed again following a location damaged by a scratch on the recording medium without performing a special or specific playback even when the reading has been forcibly terminated for example due to the scratch, while ensuring that the number of playbacks be not counted down when reading the information that is only allowed to be played back for a limited number of playbacks.

Means for Solving the Problem

In order to solve the above identified problems, one aspect of the present invention provides the recording medium playback device that includes: an information reading unit that can read information that is only allowed to be played back for a limited number of playbacks the recording medium; an information playback unit that plays back the information read by the information reading unit; a control unit that counts the number of playbacks for the above information, controls the reading or the playback of the information performed by the information reading unit and the information playback unit, and forcibly terminates the reading and/or playback of the information when the reading or the playback of the information is not successful; and a storage device that, when the control unit has forcibly terminated the reading and the playback of the information, stores a location on the recording medium at which the reading has been forcibly terminated. When the reading and playback of the information is attempted again after the forced termination, the information reading unit controlled by the control unit reads the information residing at a location that is away from the location stored in the storage device by a predetermined period of time, and the information playback unit controlled by the control unit plays back the information without counting the number of playbacks.

According to the recording medium playback method of the present invention, information that is only allowed to be played back for a limited number of times is read from the recording medium, and the number of playbacks is counted for the read information. When the reading and the playback of the information is forcibly terminated as a result of the unsuccessful reading or playback of the information, the location on the recording medium at which the reading was forcibly terminated is stored, and, when the reading and the playback of the information is started again after the forced termination, information residing at the subsequent location that follows the stored location by a predetermined period of time is read without the number of playbacks being counted.

BRIEF DESCRIPTION OF THE DRAWINGS

FIG. 1 is a block diagram of an optical disk player according to one embodiment of the present invention.

FIG. 2 is a flowchart of operation of the optical disk player illustrated in FIG. 1 in a case of forced termination of the optical disk player due to a scratch on a recording medium and subsequent playback.

REFERENCE NUMERALS

1: Optical disk player (recording medium playback device)
3: Optical pickup (information reading unit)
5: Control unit (control device, information playback unit)
52: AV decoding unit
53: CPU (control device)
8: RAM unit (storage unit)
S6: Step of playback (information playback unit)
S11: Step of storing the last address (storage unit)

BEST MODE FOR CARRYING OUT THE INVENTION

A recording medium playback device according to one embodiment of the present invention is described below. If information that is only allowed to be played back for a limited number of playbacks has not been successfully read or played back, a control unit controls the recording medium playback device, and a location of forced termination, i.e., a location on the recording medium at which the playback has been forcibly terminated, is stored in a storage device.

Another round of the playback is started again from the information residing at a subsequent location, i.e., a location that follows at a predetermined time interval the location stored in the storage device, while the playback at this time following the forced termination does not cause the number of playbacks to be counted.

This provides an advantage of reducing or eliminating user's inconveniences: After the forced termination of the playback, the playback will be started again, starting from the information residing at the subsequent location that follows the location of the forced termination, and thus it is possible to play back the information residing at the subsequent location that follows the location damaged by the scratch. In addition, the subsequent playback, i.e., the playback that has been started again following the forced termination due to a device-specific factor, does not cause the number of playbacks to be falsely or erroneously counted.

Further, in a case where the subsequent playback of the information fails at the subsequent location that follows the location of the forced termination at the predetermined time interval, the control unit may control the playback device such that the playback is started from another location that further follows at the predetermined time interval the above-defined subsequent location that is away from the location of the forced termination. Thus, the playback can be attempted for several times even when the above-defined subsequent playback failed.

The recording medium playback method according to one embodiment of the present invention includes: storing the location of the forced termination, i.e., the location on the recording medium at which the playback has been forcibly terminated due to unsuccessful reading of the information that is only allowed to be played back for the limited number of playbacks; and playing back the information residing at the subsequent location, i.e., the location that follows the location of the forced termination at the predetermined time interval without causing the number of playbacks to be counted.

This provides the advantage of reducing or eliminating the user's inconveniences: After the forced termination of the playback, the playback will be started again, starting from the information residing at the subsequent location that follows the location of the forced termination, and thus it is possible to play back the information residing at the subsequent location that follows the location damaged by the scratch. In addition, the subsequent playback, i.e., the playback that has been started again following the forced termination due to a device-specific factor, does not cause the number of playbacks to be falsely or erroneously counted.

First Embodiment

The optical disk player 1 as the recording medium according to the first embodiment of the present invention is explained with reference to FIGS. 1 and 2. The optical disk player 1 is a device that plays back an optical disk such as a compact disc (CD) and a digital versatile disc (DVD). As shown in FIG. 1, the optical disk player 1 includes a disk motor 2, an optical pickup 3, a radio frequency (RF) amplifier 4, a control unit 5, a RAM unit 8, a flash memory unit 9, and a driver 10.

The disk motor 2 is a motor that rotates the optical disk 11 loaded in the optical disk player 1. The disk motor 2 has a spindle motor and other related components.

The optical pickup 3 as an information reading unit has (a) a laser diode (not shown) that emits a laser beam applied to the optical disk 11, (b) an objective lens that applies the laser beam emitted by the laser diode to the optical disk 11, (c) an actuator that drives the objective lens in response to an instruction sent by the control unit 5 and adjusts focusing and tracking of the objective lens, and (d) a light receiver that receives the laser beam reflected from a surface of the optical disk 11. The optical pickup 3, based upon signals output by the light receiver, generates and outputs an RF signal that carries content data, i.e., the information recorded on and retrieved from the optical disk 11, and other control signals generated depending upon an intensity of the reflected laser beam.

The RF amplifier 4 amplifies the signals input from the optical pickup 3 so that the signals have a predetermined level or value, and outputs the amplified signals to the control unit 5.

The control unit 5 as an information playback unit and control unit has a signal processing unit 51, an AV decoding unit 52, and a CPU 53.

The signal processing unit 51, on the basis of the control signal that is input from the RF amplifier 4, drives the objective lens of the optical pickup 3 and controls focusing and tracking of the objective lens of the optical pickup 3, and ensures that the information recorded on the optical disk 11 can be read out with accuracy. In addition, a signal indicative of control information including the content data input from the RF amplifier 4 and information on a limit placed on the number of playbacks of the content data is A/D converted, and a resulting digital signal is output to the AV decoding unit 52 and the CPU 53.

The AV decoding unit 52 as the information playback unit performs necessary error correction, decoding, and then digital-to-analog conversion of the digital signal that has been sent from the signal processing unit 52, and outputs a resulting analog signal on an audio output terminal 6 and a video output terminal 7.

The CPU 53 as the control unit controls the signal processing unit 51 and the AV decoding unit 52 using control programs stored in a ROM unit (not shown), and performs processing related to a case where any scratch is found on the surface of the optical disk 11, and handles the number of playbacks for the content data that is only allowed to be played back for the limited number of playbacks.

The RAM unit 8 as the storage device is a memory unit providing a work area for storing an address which corresponds to the location at which the playback of the optical disk 11 is forcibly terminated and a work area for processing performed by the signal processing unit 51 and the CPU 53 of the control unit 5. The non-volatile flash memory unit 9 is used to store information including the limit on the number of playbacks for the content that is only allowed to be played back for the limited number of playbacks.

The driver 10 amplifies a signal input from the control unit 5 and outputs an amplified signal to the disk motor 2 and the optical pickup 3.

The content data stored in the optical disk 11 is DivX-encoded, part of which is only allowed to be played back for the limited number of playbacks.

The following explains methodology of placing the limit on the number of playbacks according to DivX specification. The content data whose number of playbacks is limited is called a "rental file". The rental file contains information of the content data as such including image data, and header information indicating the allowable number of playbacks. When reproducing the rental file stored in the recording medium such as the DVD, identification information (TOC, for example) and information on counting of the number of playbacks that are recorded on the recording medium are associated with each other, both of which will be stored in the flash memory unit 9. When the rental file is played back for the next round, the recording medium is identified with reference to the above identification information, and the header information of the rental file is compared with the information on the counting of the number of playbacks stored in the flash memory unit 9. When an upper limit of the number of playbacks has been reached, another round of reproduction of the content data is no more possible. In addition, since both of the identification information and the allowable number of playbacks in the header information are stored in the flash memory unit 9, the allowable number of playbacks is counted down by the CPU 53 every time another round of playback is attempted, and thus the subsequent playback can be prohibited when the allowable number of playbacks has been counted down to zero.

The following paragraphs are dedicated to explanation of playback operation of the optical disk that stores the DivX-encoded content data and having on its surface a large scratch, with reference to the FIG. 1 illustrating the optical disk player 1 and FIG. 2 showing a flowchart of the playback operation. The operation of the flowchart of FIG. 2 pertains to the control program stored in the ROM unit of the CPU 53 and executed by the CPU 53.

In the step S1, it is determined whether a user has instructed the CPU 53 to execute the playback from an operation panel (not shown). If the judgment is affirmative (when "Yes"), then the process goes to the step S2. If negative (when "No"), the above judgment is repeated.

In the step S2, the identification information of the optical disk 11 is read, and the read identification information is compared with the identification information stored in the flash memory unit 9, and thus the optical disk 11 is identified. Thereafter, the process goes to the step S3. When the identification information that corresponds to the optical disk 11 is not found in the flash memory unit 9, it is judged that the optical disk is going to be played back for the first time. The identification information of the optical disk 11 is then stored in the flash memory unit 9, and the process goes to the step S3.

In the step S3, depending upon the judgment in the step S2, the process goes either to the step S4 in a case of an initial playback (when "Yes"), or otherwise to the step S13 (when "No").

In the step S4, the header information that indicates the number of playbacks of the content data recorded in the optical disk 11 is associated with the identification information and stored in the flash memory unit 9. Thereafter, the process goes to the step S5.

In the step S5, one (1) is subtracted from the allowable number of playbacks of the content data stored in the flash memory unit 9 in the step S3, and the resulting number of playbacks is then stored as the latest number of playbacks. Thereafter, the process goes to the step S6.

In the step S6, the content data recorded in the optical disk 11 is played back and thereafter the process goes to the step S7. The content data read from the optical disk 11 is input via the RF amplifier 4 to the signal processing unit 51. AV decoding unit 52 performs DivX decoding for the A/D-converted content data, and the content data decoded in the form of video and audio data is D/A converted and output on the audio output terminal 6 and the video output terminal 7, respectively. In addition, information indicating the address corresponding to the location on the optical disk 11 is taken out of the content data that has been A/D-converted by the signal processing unit 51 and is output to the RAM unit 8. In addition, the address output to the RAM unit 8 may be first output to the CPU 53, converted into time information (for instance, one minute and three seconds on the track 3 or four minutes and two seconds on the chapter 4) and then output to the RAM unit 8.

In the step S7, it is determined on the operation panel (not shown) whether the user has instructed the CPU 53 to stop the playback or the playback has been finished to the end of the information recorded in the optical disk 11. If the instruction to stop the playback is issued or the playback has been completed (when "Yes"), then the process goes to the step S15. Otherwise (when "No"), the process goes to the step S8.

In the step S8, it is determined whether or not the scratch is found on the optical disk. If the judgment is affirmative, then the process goes to the step S9. If negative, then the process goes back to the step S6. As an example, the scratch can be found based upon whether or not an intensity of the reflected beam of the laser beam applied to the optical disk 11 (RF signal, etc.) is lower than a predetermined value.

In the step S9, the signal processing unit 51 is instructed to play back information residing at the address corresponding to the location that follows the current location of the playback in terms of the predetermined period of time, and then the process goes to the step S10. The predetermined number of the addresses is a difference between the current location of playback and the address at which the content data to be played back following the data in the current location is stored. This can be specified not only by the address but also by a parameter in units of time (for instance, one second ahead). The predetermined number of the addresses should preferably be defined such that a small scratch can be skipped by the predetermined number of the addresses (or time) and at the same time the user does not feel stressed or erratic about the length of time.

In the step S10, it is determined whether or not the process of the step S9 is repeated for a predetermined number of times. If affirmative, then the process goes to the step S11. If negative, then the process goes back to the step S6. Larger the predetermined number of repetitions of the process of the step S9, the higher the possibility of getting out of the scratch. However, since the user cannot hear or view the content data during the process of the steps S8 to S10, the number of repetitions should be kept at a level that the user does not feel stressful.

In the step S11, the address at which the content data has been read from the optical disk 11 is stored as the last address in the RAM unit 8, and then the process goes to the step S12. In addition, a parameter in terms of time (for instance, one minute and three seconds on the track 3 or four minutes and two seconds in the chapter 4) may be stored in the RAM unit 8 instead of the address. That is, in this step, the last address that has been stored in the RAM unit 8 indicates the location on the recording medium where the reading of the data has been forcibly terminated.

In the step S12, it is judged that the playback cannot be continued, and the playback is forcibly terminated. Occurrence of the forced termination is then indicated on the display device (not shown) to notify the user. It is clear that the term "forced termination" in this specification is not a termination attempted by the user or a termination after the optical disk has been completely played back, but the termination that is performed by the control unit 5 due to the device-specific problems on the side of the optical disk player 1 and/or the optical disk 11 which cannot be played back any further.

In the step S13, it is determined whether or not the last address is stored in the RAM unit 8. If affirmative (when "YES"), since in this case the previous playback has been terminated due to the forced termination, the process goes to the step S14 to start again the playback from the location of the forced termination. Meanwhile, if the last address is not stored in the RAM unit 8 (when "No"), the process goes back to the step S5 to start another round of the playback of the content data from its beginning. In the latter case, the playback of the content data will be made from the very beginning of the content data, and one (1) is subtracted from the number of playbacks of the content data recorded in the flash memory unit 9.

In the step S14, the last address that was stored in the RAM unit 8 in the step S11 is read out, and the signal processing unit 51 is instructed to move the optical pickup to a location corresponding to the address that has been read, and the process goes to the step S6. Thus, the playback of the information is started again from the location at which the previous playback was forcibly terminated. In this case, since the step S5 is skipped and the process goes to the step S6, the playback of the information does not cause the number of playbacks to be erroneously or falsely counted down.

In the step S15, the user is notified of normal termination of the playback on the display device (not shown) as the user has instructed to stop the playback or has completely played back the optical disk 11 in the step S7.

When the playback is started again immediately after the forced termination, the process goes to the steps S13, S14, S6, S7, and S8. Even when the scratch is found, a predetermined number of addresses can be skipped from the location of the forced termination. This increases probability of getting out of the location affected by the scratch.

The optical disk player 1 according to this embodiment plays back the optical disk such as the CD and the DVD that stores the information that is only allowed to be played back for the limited number of playbacks. When the optical disk 11 has the scratch thereupon and the playback is forcibly terminated due to the scratch, the address at which the forced termination occurred on the optical disk 11 is stored in the RAM unit 8. When the playback is to be started again, the above address stored in the RAM unit 8 is read out, and the playback starts again at a subsequent address, i.e., an address that follows the above address by the predetermined period of time, without counting of the number of playbacks. Accordingly, the unnecessary counting down of the number of playbacks can be avoided, thus reducing or eliminating the user's inconveniences. Also, when the playback again fails at the subsequent address that follows the address stored in the RAM unit 8 by the predetermined period of time, the playback of the information is performed at another address that further follows the subsequent address by the predetermined period of time. By virtue of this repetition of playbacks for the predetermined times, in the case of the large scratch that causes such forced termination, the playback does not need to be performed all the way from the beginning, and the data residing at the location that follows the scratch can be played back without skipping.

Although the above-described embodiment contemplates the operation of the playback device in the case of the optical disk having the scratch thereupon, this in no way implies that other types of forced termination caused by for example deformation of the optical disk or a dust on the optical disk cannot be addressed by the device and method according to the present invention. As an example, the present invention can be applied to a case where the optical disk fails to be read and the playback is forcibly terminated under an internal temperature of the playback device higher or lower than the specifications, when under severe vibrations, or when the device-specific-factors of the playback device prevents normal decoding of the read information. In addition, when the playback device is affected by the device-specific factor, it is also possible to perform the playback not from the address following the address of the forced termination by a predetermined period of time but from the very address at which the forced termination occurred.

In addition, in the above-described embodiment, the optical disk contains the DivX-encoded content data. Needless to say, encoding formats other than the DivX format, for example, MPEG (Moving Picture Expert Group) can also be used. Also, methodology other than that described in the embodiment can be used to control or limit the allowable number of playbacks. Likewise, it is also possible to limit the number of playbacks using another separate device. Consequently, the present invention can prevent the playback after the forced termination from being counted as another round of the playback while the present invention does not presuppose any particular encoding system or specific methodology of limiting the number of playbacks.

In addition, although the recording medium that is used in the above-described embodiment is the optical disk, of course there are other possibilities: The present invention can be applied to the playback device incorporating different types of the recording media such as a hard disk or a semiconductor memory.

The recording medium playback device and the method for playing back the recording medium which are obtained in accordance with the above-described embodiment can be summarized as follows, respectively:

(A) The optical disk player 1 that has (a) the optical pickup 3 that read from the optical disk 11 the content data that is only allowed to be played back for the limited number of playbacks; (b) the control unit 5 that plays back the information read by the optical pickup 3; (c) the control unit 5 that counts the number of playbacks of the content data, controls the reading or playback of the content data performed by the optical pickup 3 and the control unit 5, and forcibly terminates the playback of the content data if the reading or playback of the content data is not successful; (d) the RAM unit 8 that stores the address corresponding to the location at the time of the forced termination of the playback on the optical disk 11 when the control unit 5 forcibly terminates the reading and playback of the content data. When the content data is again read and played back after the forced termination, the optical pickup 3 controlled by the control unit 5 retrieves the content data residing in the subsequent location that follows the location stored in the RAM unit 8 by the predetermined number of addresses, and the control unit 5 executes the playback of the content data while ensuring that the number of playbacks be not counted.

The optical disk player 1 as described above is capable of playing back the content data residing at the address which, at the predetermined time interval, follows the address at the time of the forced termination due to the scratch. The number of playbacks is not counted even when another playback is attempted after the forced termination of the playback due to a problem specific to the optical disk player 1. Thus, the inconvenience that the user has to endure is mitigated or eliminated.

(B) The optical disk playback method for playing back the optical disk 11, which includes reading the content data that is only allowed to be played back for the limited number of playbacks from the optical disk 11, and playing back the read content data with counting the number of playbacks of the read content data. When the reading and the playback of the content data is forcibly terminated during unsuccessful reading or playback of the content data, the address at which the reading of the data was forcibly terminated on the optical disk is stored. When the reading and the playback of the content data is started again after the forced termination, the content data residing at the subsequent address that follows the stored address by the predetermined number of addresses is read out, and the content data is played back while the number of playbacks is not counted.

According to the above optical disk playback method, it is possible to play back the content data residing at the subsequent address which, at the predetermined time interval, follows the address of the forced termination where the scratch has been found. Accordingly, the number of playbacks is not unnecessarily or falsely counted even when another playback is attempted after the forced termination of the playback. Thus, the inconvenience that the user has to endure is mitigated or eliminated.

It should be noted that the embodiment described above is illustrated as an example of the possible embodiments of the present invention, and that numerous modifications and variations can be effectuated within the spirit and scope of the present invention.

The invention claimed is:

1. A recording medium playback device comprising:
   (a) an information reading unit that reads information from a recording medium, said information being only allowed to be played back for a limited number of playbacks;
   (b) an information playback unit that plays back said information that has been read by said information reading unit; and
   (c) a control unit that controls reading of said information by said information reading unit and playback of said information by said information playback unit, and forcibly terminates the reading or the playback if the reading or the playback of the information is not possible, and
   (d) a storage device connected to said control unit, the storage device being configured to store a location of forced termination of the reading on said recording medium when the reading and the playback of the information is forcibly terminated by said control unit,
   wherein (A) said control unit is configured to control said information reading unit to read said information, control said information playback unit to play back said information, and count down said number of playbacks of said information if the reading or the playback has been attempted for the first time or if the reading or the playback is attempted in a state where said location of the forced termination is not stored in said storage device, and (B) when the reading or the playback is attempted again after the forced termination, the control unit is configured to control, said information reading unit to read information residing at a subsequent location that follows said location of the forced termination stored in said storage device at a predetermined time interval, and then control said information playback unit to play back said information at said subsequent location and not count down said number of playbacks.

2. The recording medium playback device as set forth in claim 1 wherein, after the forced termination, if said information reading unit controlled by said control unit cannot read said information residing at said subsequent location, or if said information reading unit controlled by said control unit cannot play back the information residing at said subsequent location, then said information reading unit reads information residing at another location that follows said subsequent location at the predetermined time interval, and said information playback unit plays back said information residing at said other location that follows said subsequent location.

3. A recording medium playback method comprising the steps of:
   (a) reading information that is only allowed to be played back for a limited number of playbacks from a recording medium;
   (b) playing back said information that has been read and, if reading or playing of said information is attempted for the first time or if the reading or the playing of said information is attempted after a normal termination of playback, then counting down the number of playbacks;
   (c) if reading of said information has been forcibly terminated due to unsuccessful reading or unsuccessful playback of said information, then storing a location of forced termination on said recording medium at which the reading of said information has been forcibly terminated;
   (d) reading said information residing at a subsequent location that follows at a predetermined time interval said location of the forced termination when the reading and the playback of said information is attempted again after the forced termination; and
   (e) playing back said information residing at said subsequent location and not counting down said number of playbacks.

* * * * *